Figure 1:
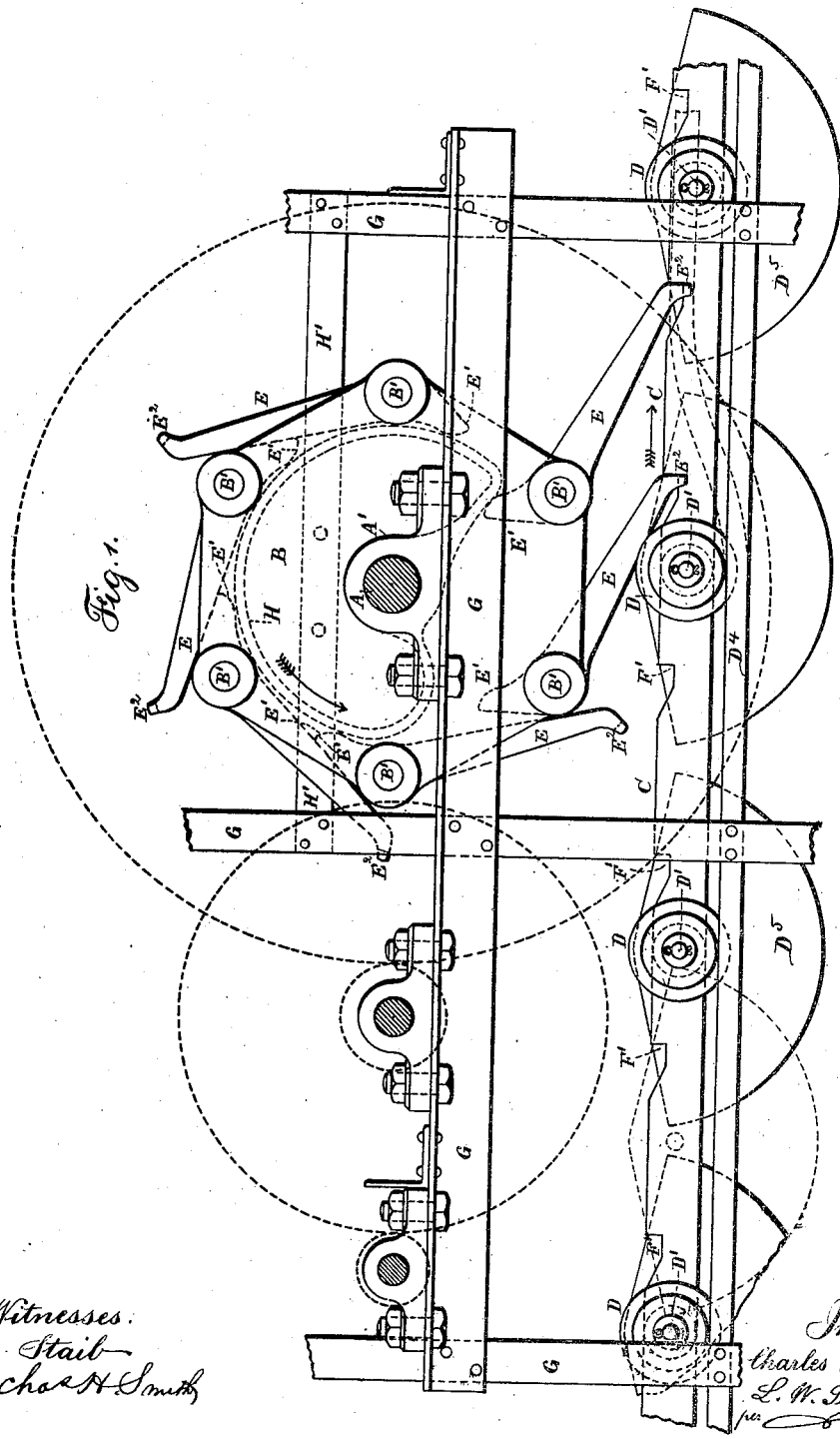

(No Model.)

C. W. HUNT.
DRIVING MECHANISM FOR ENDLESS CHAIN CONVEYERS.

No. 425,798. Patented Apr. 15, 1890.

2 Sheets—Sheet 1.

Witnesses:
J. Staib
Chas H. Smith

Inventor:
Charles W. Hunt
L. W. Serrell
Atty (No Model.) 2 Sheets—Sheet 2.
C. W. HUNT.
DRIVING MECHANISM FOR ENDLESS CHAIN CONVEYERS.
No. 425,798. Patented Apr. 15, 1890.
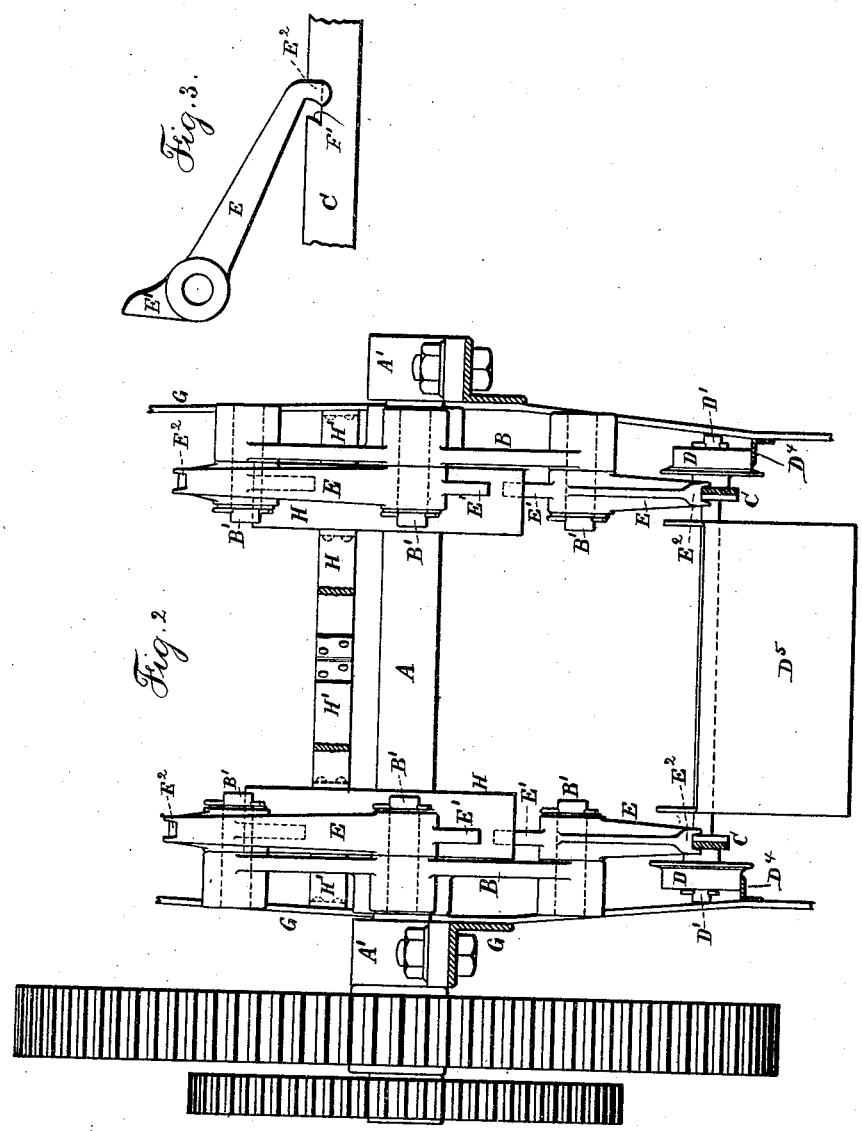
Witnesses:
J. Staib
Chas H Smith
Inventor:
Charles W. Hunt
per Lemuel W. Serrell
Atty

UNITED STATES PATENT OFFICE.

CHARLES W. HUNT, OF WEST NEW BRIGHTON, NEW YORK, ASSIGNOR TO THE McCASLIN MACHINE COMPANY, OF SAME PLACE.

DRIVING MECHANISM FOR ENDLESS-CHAIN CONVEYERS.

SPECIFICATION forming part of Letters Patent No. 425,798, dated April 15, 1890.

Application filed February 3, 1890. Serial No. 339,060. (No model.)

*To all whom it may concern:*

Be it known that I, CHARLES W. HUNT, a citizen of the United States, residing at West New Brighton, in the county of Richmond and State of New York, have invented an Improvement in Mechanism for Driving Endless Chains for the transportation of all kinds of material from one point to another, or for any other purpose for which endless chains may be employed, of which the following is a specification.

The driving mechanism that has heretofore been employed for driving endless chains has consisted of sprocket-wheels which engage with the links of the chain, and the location of which in relation to the chain is arbitrary, and the constant changing of the length of the links, caused by the wear, changes the relation between the sprockets on the sprocket-wheel and the links, which, when the chain is worn, and consequently lengthened, will not properly engage with the sprocket projections or recesses on the driving sprocket-wheel, and the looseness or sliding movement between the links of the chain and the sprocket-wheel while under strain is not only destructive to both sprocket-wheel and chain, but produces a jerking uneven movement of the chain, and consequently is very noisy when in operation.

The object of my present invention is to provide a driving mechanism which can be placed at any desired point or location along the line of the chain most convenient to the power or engine, and to provide for the wear and consequent lengthening of the links and chain, so that there will always be a positive engagement between the driver and the links of the chain, and to prevent sliding movement between the driving mechanism and the links of the chain while under strain, and at the same time impart to the chain a motion that will be more positive and even, and to that end I employ a driving mechanism, which is hereinafter fully explained.

In the drawings, Figure 1 is a side elevation of my improved driving mechanism, the shafts being in section and the gears in dotted lines. Fig. 2 is an end view of the same, and Fig. 3 is a view in detail of one of the teeth and a notched link of modified form.

The driving mechanism is composed of a shaft A in bearings A' upon the frame G of the machine, and upon said shaft A there are companion or disk wheels B. The disk-wheels B are provided with studs or pivots B' upon one side at equidistant points, and upon the studs or pivots B' there are teeth E, the outer ends of which are adapted to engage the notches F' in the links of the chain C. The inner ends of the teeth E have projections E'. The cams H are held in position by the straps H', secured to the frame G. The chain C may be of the form shown and supported on wheels D and axles D', or stationary guides or rollers, or of any other form suitable to engage with the teeth E of the driving mechanism.

The disk-wheels B in the drawings, are shown as hexagonal; but I do not limit myself as to the shape shown, as they may be made round or any other suitable shape. I have shown a track $D^4$, supported by the frame G, for the wheels D to run upon, and have represented buckets at $D^5$, carried by the axles of said wheels D. Neither do I limit myself to the number of disk-wheels B, as I may use but one disk-wheel and one chain C, or more disk-wheels B and more chains C, as the necessities of the case may require. Neither do I limit myself to the number of teeth E, pivotally attached to the disk-wheels B, and consequently to the number of projections or notches F' in the chain-links.

The operation of the mechanism is as follows: Power is communicated to the disk-wheels B and shaft A in any desired manner, and the disk-wheels B revolve in the direction of the arrow. The teeth E each successively engage with the notches or projections F' in the links of the chain C, and the chain C is moved in the direction of the arrow. As each tooth finishes its engagement with the notch or projection F' in the link it is folded up toward the periphery of the disk-wheels B by means of the projection E' on the inner end of the tooth engaging with the stationary cam or cams H, and the teeth E are held in their folded positions until they pass around into operative position again, and as they are released from the cam or cams H they immediately drop down into position and behind the projection or notch F' in the chain-link. The motion of the disk-wheel or wheels B and their teeth E in their rotation toward the chain and then in the direction in which the chain moves and then away from the chain produces a varied speed in relation to the chain; but as the teeth are pivotally attached to the disk-wheels B the succeeding teeth gain on the notch of the chain-link and by means of the cam or cams H the teeth E are caused to engage with the projection or notch F' in the links of the chain at a time when the tooth is traveling in relation to the chain at a speed as fast as the chain without producing any noticeable jar, and at a time while the preceding tooth is still engaged with the chain and at a point when the preceding and succeeding teeth are moving in relation to the chain at practically the same speed. Soon after the succeeding tooth E has engaged with the projection or notch F' in the link of the chain the movement of the preceding tooth is retarded because its stud is rising and moving nearly across a straight line between the projection or notch of the link and the center of the disk-wheel while the chain is by reason of the succeeding tooth being pushed on in a straight line and away from the preceding tooth. This releases the preceding tooth from its engagement with the projection or notch in the link, and the projection on the inner end of the tooth engages with the stationary cam which raises up the tooth, and so the operation continues.

By the use of disk-wheels with teeth pivotally attached thereto and cams for folding the teeth up from the operative position and for regulating the time of engagement between the teeth and the chain I am able to get better contact between the teeth and links and have fewer notches in the chain and a less number of teeth in the disk-wheel, and at the same time get a motion that is steady and even, and by reason of the teeth coming into operative position at a point some distance behind the projection or notch in the link of the chain admits of a large amount of wear and consequent lengthening of the links of the chain without in any way affecting the positive engagement of the teeth with the projections or notches in the links of the chain, and with this arrangement there is no sliding movement between the teeth and the links of the chain while under strain.

Fig. 3 shows a modified form of the end of the tooth which engages with the chain-link and a notch in the link. In cases where the chain is utilized for transferring loads from one point to another, if there should be a downward grade from loading-point to point of delivery, the chain might, when loaded, move faster than desirable, and in such cases the projection or notch in the links of the chain and the tooth engaging the chain may be made to act as a check and retard the movement of the chain and force it to move at the desired rate by regulating the movement of the disk wheel or wheels. In such cases the driving mechanism serves the double purpose of driving and retarding the movement of the chain.

The driving portion of the device has been fully explained in the foregoing specification, and I will now describe the retarding action. When the chain starts to move faster than the movement of the disk-wheels and teeth, the hook projection on the rear side of the tooth engages with the rear side of the notch or projection in the links of the chain, and thereby controls the movement of the chain, and as each tooth engages the successive notches or projections in the link-chain and is released it is folded up by means of the cam or cams, as before described. The endless chains may be used for any purpose. I have represented such chains as adapted to give motion to buckets so as to form an endless-chain conveyer, but do not limit myself in this particular.

I claim as my invention—

1. The combination, with a chain conveyer having notched links and a track for supporting the same, of a disk or wheel, teeth pivotally connected therewith, and having claw ends adapted to engage the notches of the links, substantially as specified.

2. In a driving mechanism for driving endless chains, disk-wheels, teeth pivotally attached thereto and arranged to engage with the links of the chain, and a cam or cams for folding up the teeth and regulating the time of engagement between the said teeth and the links of the said chain, substantially as and for the purpose set forth.

3. The combination, with the endless link-chain and means for supporting the same, of disk-wheels, teeth pivotally attached thereto and arranged to engage with the notches or projections in the links of the said chain, a cam or cams for folding up and regulating the engagement of the teeth with the chain for controlling the movement of the said chain, substantially as and for the purpose set forth.

4. The combination, with the links, the buckets, the wheels, shafts, and track, of the companion disk-wheels B, the shaft and bearings for the same, the teeth E, pivotally mounted upon said wheels B and having claw ends E² and projections E', and the stationary cams H, adapted to engage the projections E' and fold up the teeth, substantially as and for the purposes set forth.

5. The combination, with a chain and a track for supporting the same, of a wheel, teeth pivotally connected therewith and acting against the links at the opposite side to the supporting-track for moving such chain along progressively, substantially as specified.

Signed by me this 30th day of January, A. D. 1890.

CHAS. W. HUNT.

Witnesses:
GEO. T. PINCKNEY,
WILLIAM G. MOTT.